(No Model.)

E. P. T. WIDELL.
PICTURE CANVAS STRETCHER.

No. 455,523.  Patented July 7, 1891.

Witnesses  
Inventor  
Erick Paul Theodor Widell

UNITED STATES PATENT OFFICE.

ERIK PAUL THEODOR WIDELL, OF ALBINA, OREGON.

PICTURE-CANVAS STRETCHER.

SPECIFICATION forming part of Letters Patent No. 455,523, dated July 7, 1891.

Application filed November 24, 1890. Serial No. 372,564. (No model.)

*To all whom it may concern:*

Be it known that I, ERIK PAUL THEODOR WIDELL, a citizen of the United States, residing at Albina, in the county of Multnomah and State of Oregon, have invented a picture-canvas-stretcher clamp for stretching canvas on picture-stretchers to any desired tension and holding the mitered ends of the picture-stretcher in position, of which the following is a specification.

The following is a full, clear, and exact description of the invention, reference being had to the accompanying drawings.

The object of my invention is to stretch, loosen, and adjust the canvas on any mitered picture-stretcher to any desired tension by expanding the stretcher at any or all joints by means of a wedge with flanges which hold the mitered ends in position relatively to each other.

Figure 1:
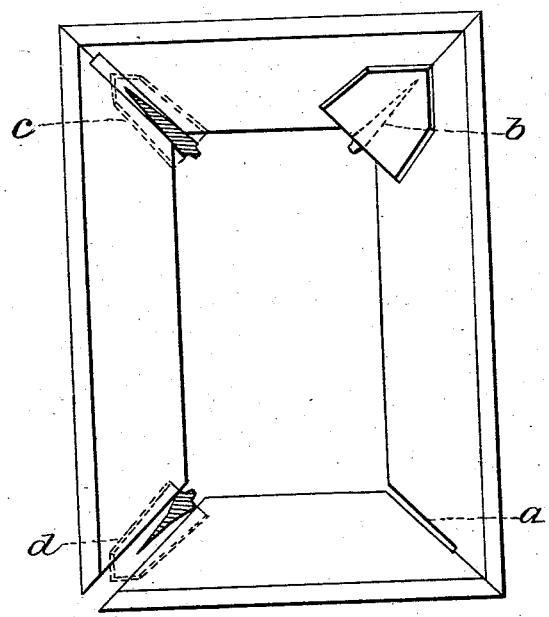

Figure 1 represents an ordinary picture-stretcher with mitered joints, in each of which is a slot one-eighth of an inch wide and as long as the wedge of the clamp, as shown at $a$ in the lower right-hand corner. $b$ is the clamp in position for insertion, and presents the front face or the face between the stretcher and the canvas. The parallel lines show beveled edges. $c$ is the clamp in position for insertion and presents the rear face. $d$ is the clamp inserted and acting upon the stretcher and canvas. The shaded portion is the wedge. It will be seen that the wedge is between two surfaces or flanges forming grooves in which the mitered ends of the stretcher fit, and are thereby held in position relatively to each other, and the wedge is also thereby held in position. The wedge moves upon the mitered ends opening or closing the joint, thereby increasing or decreasing the tension of the canvas, and the flanges hold the mitered ends in position.

Figure 2:
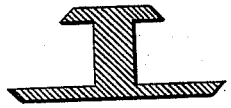
Figure 3:
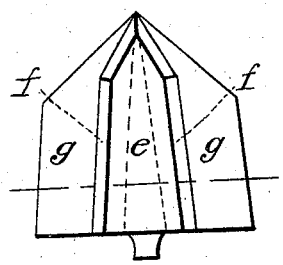

Fig. 2 represents a cross-section of the clamp. Fig. 3 represents a plan of the clamp as seen from back of the stretcher, and is the same view as $c$ and $d$ in Fig. 1. $e$ is the rear surface or flange, showing its beveled edges $ff$. $gg$ is the rear side of the front surface or flange, the front side of which is shown at $b$ of Fig. 1. The wedge is between the two surfaces $gg$ and $e$ and is concealed by the latter.

To operate this invention, first miter the stretcher together, making slots at each joint one-eighth of an inch wide and deep enough to admit the wedge its entire length. The mitered ends of the stretcher at the slot should be as thick as the height of the web of the clamp, so that they will fit between the two flanges or outer surfaces of the wedge. Adjust the clamp at the inner end of the slot with the broad surface to the front of the stretcher, square the stretcher, tack the canvas on in the usual way, and drive the wedges into the slots until the proper tension is acquired, thereby applying the principle of this invention—viz., to expand a picture-stretcher by means of this wedge-clamp until the canvas thereon is stretched to any desired tension, at the same time holding fixedly in position relatively to each other the mitered ends of the stretcher.

I claim as my invention—

The combination, with the stretcher-frame having its ends cut inclined, of two wedge-shaped plates adapted to clamp tightly the outer faces of the meeting ends of said frame, a wedge formed integrally with and centrally between said plates longitudinally and adapted to enter between the meeting ends of said frame, whereby the ends are forced apart while being held from cross displacement by said plates, substantially as shown and described.

ERIK PAUL THEODOR WIDELL.

Witnesses:
R. A. HABERSHAM,
J. R. STODDARD.